Aug. 18, 1970 L. L. FLETCHER ET AL 3,524,999

RADIATION HARDENED TRANSISTOR CIRCUIT

Filed Oct. 1, 1965

SCALE: 2 VOLTS / CENTIMETER
200 ns / CENTIMETER
RADIATION DOSE RATE
$2 \times 10^7$ ROENTGENS / SECOND INVENTORS
LARRY L. FLETCHER
MORRIS E. PAPENFUSS
BY Thomas J. Nikolai
ATTORNEY United States Patent Office 3,524,999

Patented Aug. 18, 1970

3,524,999
RADIATION HARDENED TRANSISTOR CIRCUIT

Larry L. Fletcher, West St. Paul, and Morris E. Papenfuss, St. Paul, Minn., assignors to Sperry Rand Corporation, New York, N.Y., a corporation of Delaware Filed Oct. 1, 1965, Ser. No. 491,998
Int. Cl. H03k 1/10
U.S. Cl. 307—308 6 Claims

ABSTRACT OF THE DISCLOSURE

A method and apparatus for rendering a transistor circuit less subject to the effects of transient ionizing radiation. A compensating transistor is connected to the transistor to be compensated such that the photo-currents produced when the compensating transistor is subjected to radiation provides the photo-current requirements of the transistor to be compensated. As such, the photo-currents do not flow through the load to effect the output signal.

The present invention is concerned with a method and apparatus for rendering a transistor circuit insensitive to the effects of transient ionizing radiation signals.

In electronic systems for both commercial and military applications, it is often a requirement that the system be operable in the presence of ionizing radiation, such as produced by gamma rays resulting from nuclear reactions. In the past it has been difficult to design electronic systems utilizing transistors which would operate in a reliable manner in a radiation environment. This has been due primarily to the fact that when a transistor is subjected to transient ionizing radiation, a photo-current is generated therein which flows from the collector junction to the base junction. When this transient radiation induced photo-current flows in the base circuit of a transistor, it is in effect, multiplied by the current gain ($\beta$) which then flows in the collector to emitter path of the transistor. When the transistor is operated in the common emitter mode, this amplified photo-current also flows through the load tending to affect the output signal obtained across the load element.

The present invention provides an apparatus and method for preventing transient radiation induced photo-currents from flowing through the load element of the transistor circuit. Accordingly, since the output signal obtained across the load is no way affected by the transient radiation signal, the electronic circuit is said to be hardened to radiation. In accordance with the present invention, a compensating circuit is provided which when subjected to ionizing radiation such as gamma rays, also produces a photo-current. The compensating circuit is connected to the primary circuit in such a way that the photo-current from the compensating circuit provides the photo-current requirement for the primary circuit such that the photo-current for the transistor in the primary circuit need not flow through the load element and therefore does not affect the output signal obtained across the load. Thus, it is the primary purpose of the present invention to provide a technique for hardening a transistor circuit to the effects of transient radiation.

In explaining the apparatus and technique of the present invention, reference will be made to the following drawings in which.

Figure 4:
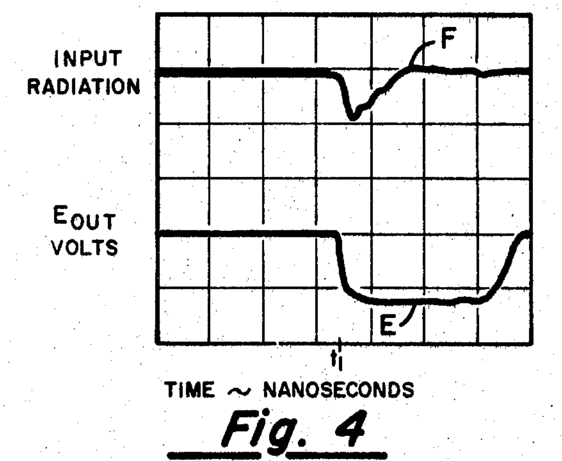
Figure 5:
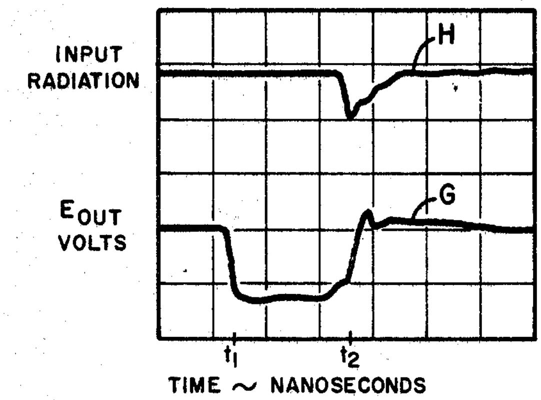

FIG. 4 illustrates the output signal waveform from the compensated circuit when subjected to radiation at a time that a normal input signal is applied thereto the switch the circuit from its non-conducting to its conducting state; and FIG. 5 illustrates the output signal waveform from the compensated circuit when subjected to radiation at a time that a normal input signal is applied thereto to switch the circuit from its conducting to its non-conductiing state.

Figure 1:
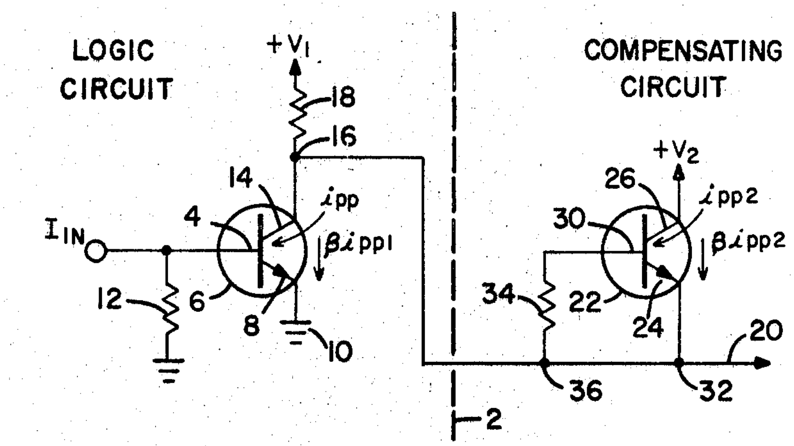
FIG. 1 is a schematic circuit diagram illustrating the techniques employed to provide radiation hardening for a transient circuit.

Referring first to FIG. 1, there is shown to the left of the dashed line 2 a typical output stage of a logic circuit found in a digital computing system. The switching diodes normally connected to the base 4 of transistor 6 for performing the gating function are not shown. The emitter electrode 8 of transistor 6 is connected directly to a point of fixed potential such as ground 10. The base 4 of transistor 6 is connected through an input resistance 12 to ground also. The collector electrode 14 is connected to a junction point 16 and a load impedance, here shown as a resistor 18, is connected at one end to the junction 16 and has the other terminal thereof connected to a source of fixed-bias potential, $+V_1$ The output from the logic circuit is obtained at the junction 16 and appears on the output conductor 20.

Before describing the details of the compensating circuits shown to the right of the dashed line 2, consideration will be given to the operation of the logic circuit in the absence of the compensating circuit. In normal operation, i.e., in the absence of ionizing radiation, the transistor 6 operates in a switching mode. When the logic input signals applied to the diodes (not shown) are such that no current flows from the base electrode 4 to the emitter electrode 8 of the transistor 6, the transistor is nonconducting and the output signals appearing at junction 16 are approximately equal to the magnitude of the source $+V_1$. However, when the logic input signals are such that a base current is provided, the transistor switches to its conducting state causing the potential appearing at junction 16 to approach that present at the emitter electrode 8. It can be seen then that the signal appearing on the output conductor 20 is binary in nature.

Figure 2:
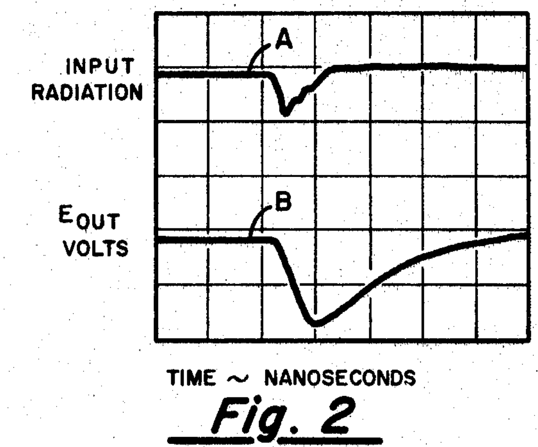
FIG. 2 illustrates by means of a waveform the effect of radiation on a transistor logic circuit when no compensation is provided.

It has been found that when the logic circuit shown to the left of the dashed line 2 is subjected to transient ionizing radiation, such as produced by a dose of gamma radiation, that primary photo-current ($i_{pp}$) is generated within the transistor and flows from the collector electrode 14 to the base electrode 4, and is similar to the collector-base leakage current $I_{CBO}$. This photo-current when flowing in the base circuit of the transistor 6 causes a secondary photo-current ($i_{ps}$) to flow through the collector to emitter path of the transistor 6. The secondary photo-current is a multiple of $i_{pp}$ and the current gain $\beta$ and flows from the source $+V_1$, through the load impedance 18, and through the collector to the emitter path of transistor 6 to ground 10. This current flowing through the load causes a potential drop on the output conductor 20 even in the absence of a legitimate input signal. This can best be seen in the waveforms of FIG. 2. The upper waveform A indicates the time of occurrence of the transient radiation burst having a dose rate of $2\times10^7$ roentgens per second. The lower waveform B illustrates the resulting change in the voltage appearing on the output conductor 20 in the absence of compensation. The scale employed is 2 volts per centimeter so it can be seen that the voltage change resulting from the transient burst is approximately 3 volts. In many logic circuit applications this magnitude of change would be equivalent to that occurring when a legitimate switching input signal is applied to the transistor stage. Hence, it can be seen that in the absence of compensation, the effect of a radiation burst may be to produce an erroneous output signal state.

Referring again to FIG. 1, the construction and operation of the compensating circuit will now be described. The compensating circuit is shown to the right of the dashed line 2 and comprises a second transistor 22 having an emitting electrode 24, a collector electrode 26 and a base electrode 30. The emitter electrode 24 is connected directly to the output conductor 20 at a junction 32. The collector electrode of transistor 22 is connected directly to a source of fixed potential $+V_2$. The base electrode 30 is connected through a resistance 34 to output conductor 20 at junction 36. It is essential for proper operation of the compensation circuit that the voltage $V_2$ applied to the collector electrode 26 be more positive than the potential $+V_1$ applied to one side of the load resistor 18 of the logic circuit. This insures that the collector-base junction of transistor 22 will be reverse biased.

Figure 3:
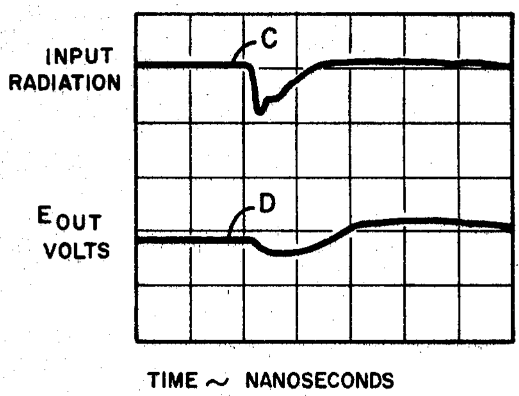
FIG. 3 is a waveform illustrating the effect of radiation, on the compensated logic circuit of FIG. 1.

Transistor 22 should be chosen such that the current gain parameter $\beta$ thereof is as close as possible to that of the logic circuit transistor 6. Also, transistors 6 and 22 should be physically located relative to one another such that the two transistors will be equally affected by the radiation burst. When these conditions are met, the incident gamma radiation striking the transistor 22 will cause a photo-current $i_{pp2}$ to flow from the electrode 26 to the base electrode 30 of transistor 22. This photo-current will result in a secondary photo-current $\beta i_{pp2}$ flowing from the collector to emitter path of the transistor 22. This secondary photo-current is then available to supply the photo-current requirements of the transistor 6. The secondary photo-current $\beta i_{pp1}$ in the transistor 6 which would otherwise be drawn through the load resistor18 from the source $+V_1$ is instead obtained from the compensating circuit transistor 22, i.e., the secondary photo-current $\beta i_{pp2}$ flows through transistor 6 by way of output conductor 20. The transient radiation induced photo-currents no longer flow through the load resistor 18 and, hence, the output signal appearing on conductor 20 remains stable in the radiation environment. Referring to FIG. 3, there is illustrated by waveform C the input radiations signal and in waveform D the output signal appearing on conductor 20 when the logic circuit is in its non-conducting condition and when the compensating circuit is utilized. By comparing waveform B of FIG. 2 with waveform D of FIG. 3, the effects of the compensating circuit becomes readily apparent. In actual tests it has been found that the addition of the compensating circuit improved the radiation hardness of the circuit by four orders of magnitude.

FIG. 4 and FIG. 5 are waveforms obtained during normal operation of the logic circuit in the presence of radiation. In FIG. 4 at time $t_1$ an input switching signal for turning the transistor from its off state to its on state is applied to the base electrode 4 of transistor 6 at the same time that a transient radiation burst (waveform F) is applied to the circuits. The waveform E which is the output signal on line 20, faithfully follows the input switching signal even though the radiation is present. Waveform G of FIG. 5 illustrates the output signal on line 20 when the radiation (waveform H) is applied at the time in which the normal input signal applied to the base electrode of transistor 6 is causing the transistor 6 to revert from its conductive to its non-conductive state. Because of the compensating technique employed, the radiation burst does not prevent the transistor from switching. Hence, it can be seen that the logic circuit remains completely functional in the presence of radiation.

The resistor 34 used to connect the base electrode 30 to the output conductor 20 is included and provides a means of balancing the current characteristics of the transistors 6 and 22 under radiation conditions. In operation, the bias applied to the base electrode of transistor 22 is adjusted to a value which causes transistor 22 to be slightly conductive. This is done so that the capacitance of the base to emitter junction will be charged and therefore a portion of the primary photo-current $i_{pp2}$ resulting from the radiation burst will not be required for charging this capacitance. As a result, the entire photo-current will be available to supply the photo-current requirements of the transistor 6. It should also be mentioned that while in the circuit illustrated in FIG. 1, NPN transistors are used, the technique works equally well when PNP transistors are employed provided the bias potentials are reversed in polarity. By using matched transistors throughout the network lends itself to fabrication through the use of integrated circuit techniques.

While the illustrated embodiment shows the technique applied to a logic circuit wherein the transistor is operated in a switching mode, it is equally applicable to other transistor circuits, such as class A amplifiers.

What is claimed is:

1. An electrical circuit which is hardened to the effects of transient radiation, comprising:

a first semiconductor current controlling device having a pair of output electrodes and a control electrode, said control electrode adapted to receive input control signals, a voltage source, a load impedance, , means connecting said load impedance and said pair of output electrodes in a series circuit across said voltage source, said first semiconductor current controlling device tending to draw a photo-current from said source through said load when subjected to a transient radiation burst to thereby alter the output signal present at a first of said pair of output electrodes; and compensating means for preventing said photo-current from flowing through said load comprising a second semiconductor current controlling device having a pair of output electrodes and a control electrode with means connecting said control electrode and one of said output electrodes of said second semiconductor current controlling devices to said first of said pair of output electrodes of said first semiconductor current controlling means and the other of said output electrodes of said second semiconductor controlling means to a source of reference potential.

2. Apparatus as in claim 1 wherein said first and second semiconductor current controlling devices are NPN transistors.

3. Apparatus as in claim 1 wherein said pair of output electrodes on said first and second semiconductor current controlling devices are the emitter and collector electrodes of NPN transistors and wherein said first of said pair of output electrodes of said first semiconductor current controlling means is the collector electrode of an NPN transistor.

4. Apparatus as in claim 1 wherein the potential applied to said second semiconductor current controlling means by said source of reference potential is greater than the potential of said voltage source.

5. An electrical circuit which is hardened to the effects of transient radiation, comprising:

a first NPN transistor having an emitter electrode, a collector electrode and a base electrode, said base electrode adapted to receive control signals, a voltage source, a load impedance, means connecting said load impedance and said emitter and collector electrodes in a series circuit across said voltage source, said first NPN transistor tending to draw a photo-current from said source through said load when subjected to a burst of transient radiation to thereby alter the output signal normally present at said collector electrode of said first NPN transistor; and compensating means for preventing said photo-current from flowing through said load comprising a second NPN transistor having an emitter electrode, a collector electrode and a base electrode with resistor means connecting said base electrode of said second NPN transistor to the emitter electrode of said second NPN transistor and the collector electrode of said first NPN transistor and the collector electrode of said second NPN transistor to a source of reference potential.

6. In an electronic circuit incorporating at least a first transistor element, a method for rendering the output signal from said first transistor element substantially insensitive to transient ionizing radiation comprising steps of:

selecting a second transistor element having parameters substantially identical to those of said first transistor element;

positioning said second transistor element in proximity to said first transistor element such that said first and second transistor elements are subjected to substantially equal doses of transient ionizing radiation, and electrically connecting said second transistor element to said first transistor element such that the current requirements of said first transistor element produced by the dose of transient radiation are supplied by said second transistor element by way of a path which does not include the load for said first transistor element.

References Cited

UNITED STATES PATENTS 3,409,839 11/1968 Crowe ----------- 307—308 X

RODNEY D. BENNETT, Primary Examiner

R. E. BERGER, Assistant Examiner

U.S. Cl. X.R.

307—297; 330—33